Patented Dec. 31, 1940

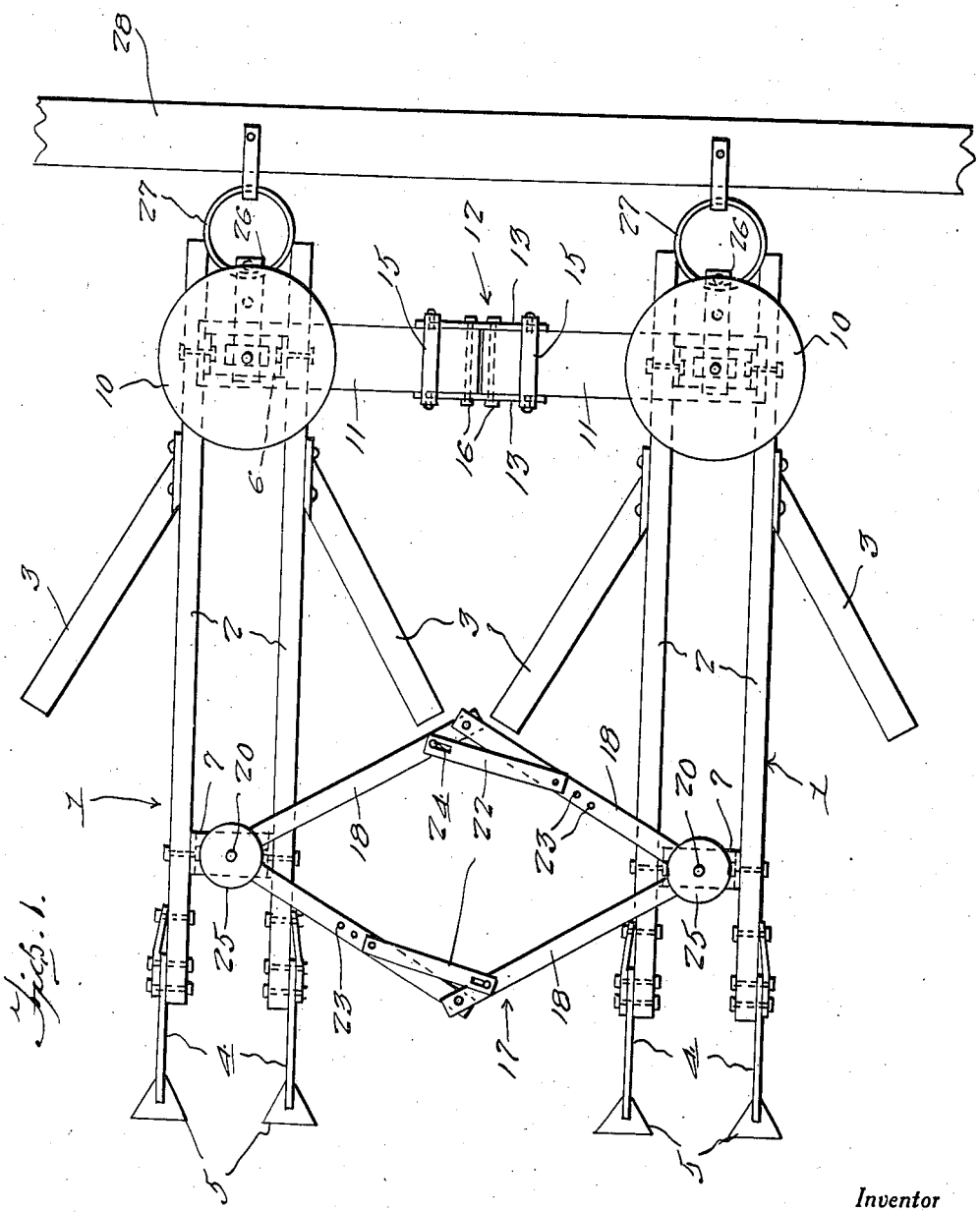

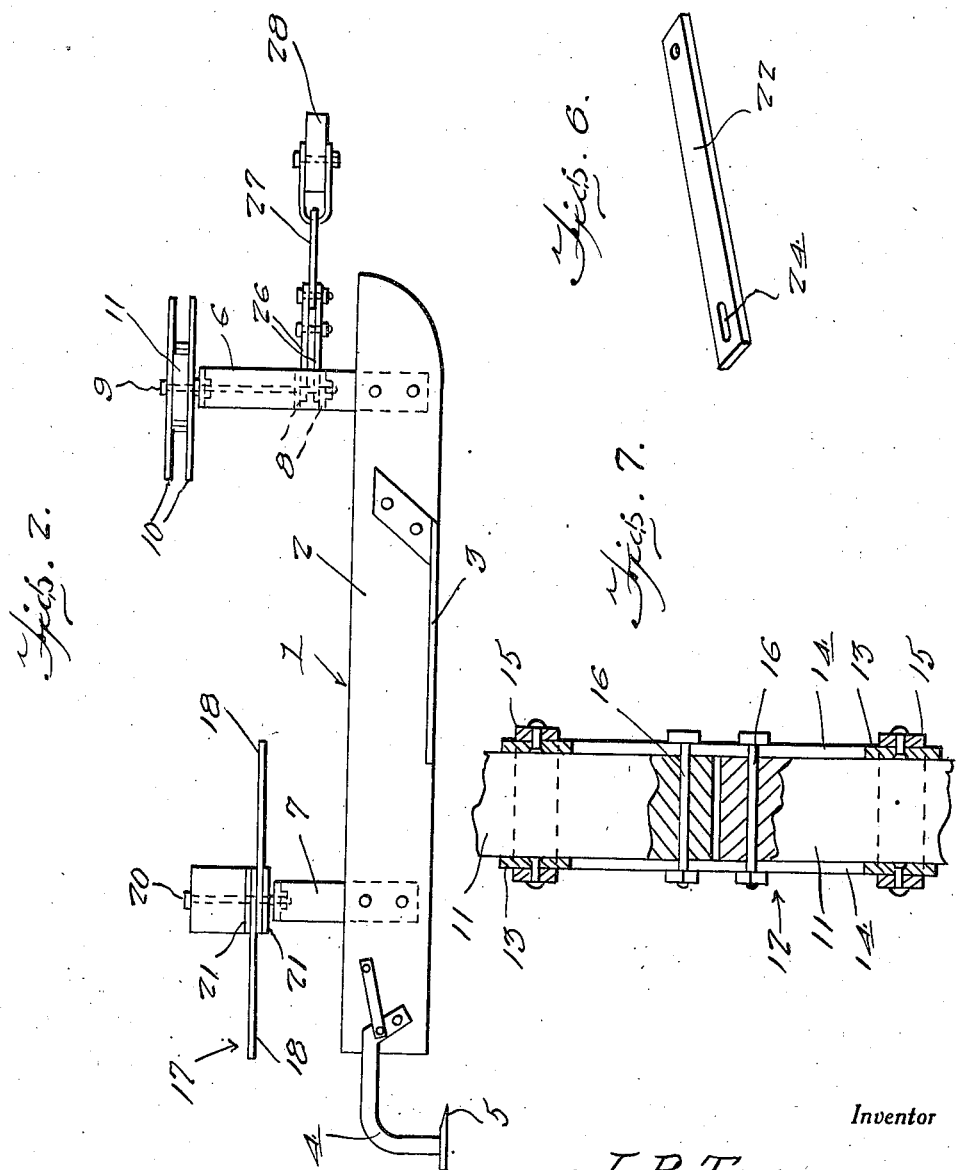

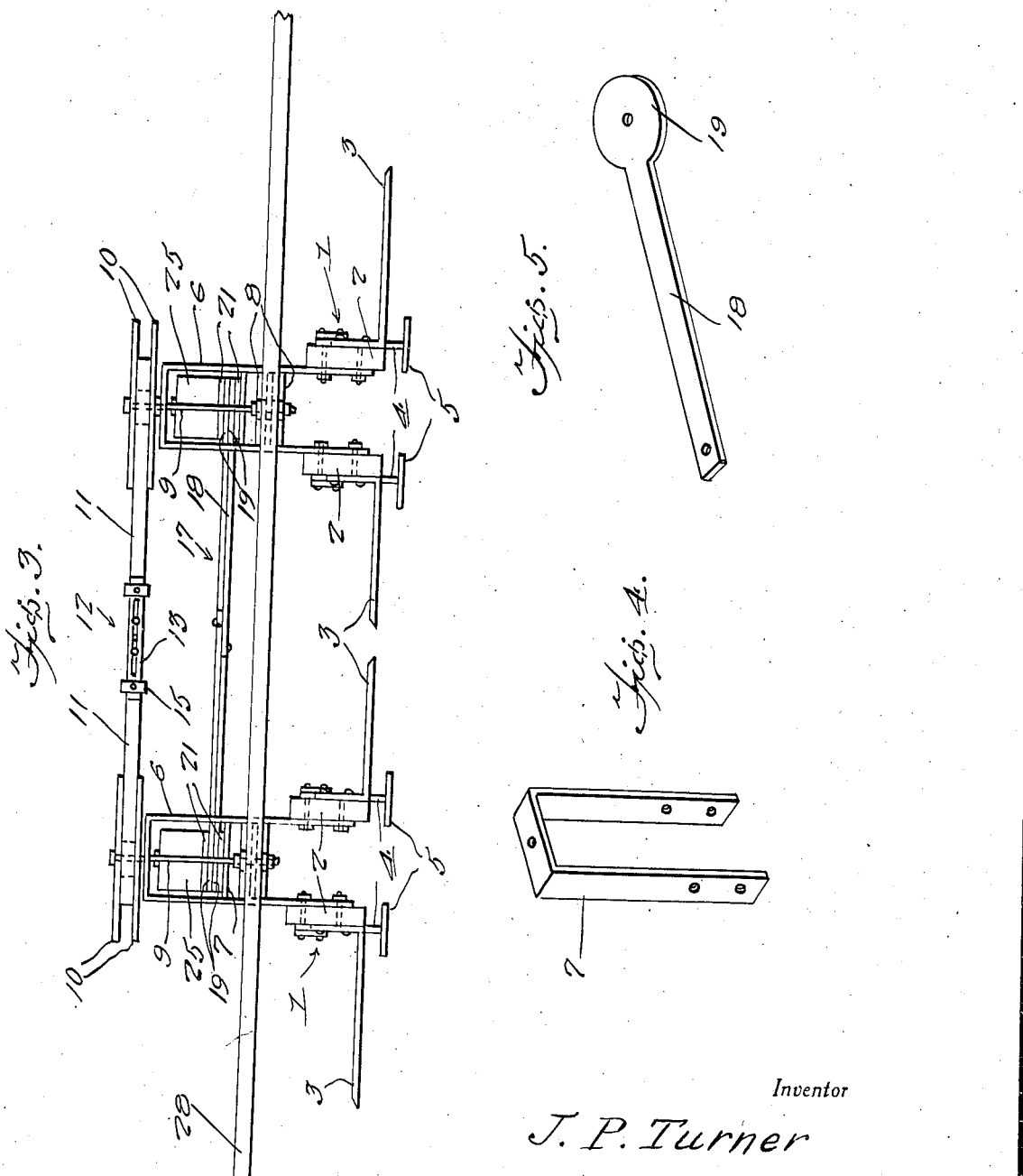

2,226,676

UNITED STATES PATENT OFFICE 2,226,676

AGRICULTURAL IMPLEMENT

James P. Turner, Tatum, N. Mex.

Application July 25, 1939, Serial No. 286,484

2 Claims. (Cl. 97—143)

The present invention relates generally to agricultural implements and more particularly to new and useful improvements in weeders of the straddle row type.

An important object of the invention is to provide, in a weeder of the aforementioned character comprising a pair of units adapted to straddle two rows, novel means for connecting said units together for lateral adjustment or movement relative to each other.

Other objects of the invention are to provide an agricultural implement of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view of an agricultural implement constructed in accordance with the present invention.

Figure 2 is a view in side elevation of the device.

Figure 3 is a front elevational view.

Figure 4 is a detail view in perspective of one of the rear arches.

Figure 5 is a detail view in perspective of one of the toggle links.

Figure 6 is a detail view in perspective of one of the toggle control bars.

Figure 7 is a view in top plan of the connection for the front connecting bars with portions thereof in horizontal section.

Referring now to the drawings in detail, it will be seen that the embodiment of the invention which has been illustrated comprises what may be referred to as a pair of parallel sled units which are designated generally by the reference numeral 1. The units 1 are adapted to straddle two rows and toward this end each of said units includes a pair of spaced, parallel runners or skids 2 of wood or other suitable material. Rigidly mounted on the forward portions of the runners 2 are rearwardly diverging scraper blades 3. Mounted on the rear end portions of the runners 2 are rearwardly and downwardly extending beams 4 having fixed on their rear ends substantially triangular scrapers 5. The pairs of runners 2 are secured together through the medium of front and rear metallic arches 6 and 7, respectively. Mounted in the front arches 6 are vertically spaced pairs of transverse braces 8.

Mounted vertically on the front arches 6 are pins 9 which extend downwardly through the braces 8. The pins 9 extend above the front arches 6 and have mounted thereon pairs of metallic discs 10. The forward end portions of the units 1 are adjustably connected by means including a pair of transverse bars 11 having one end portion journaled on the upper end portions of the pins 9 between the pairs of discs 10. The inner ends of the bars 11 are connected by an adjustable coupling 12 which is shown to advantage in Fig. 7 of the drawings. The coupling 12 includes a pair of side bars 13 having slots 14 therein. It will be observed that the inner end portions of the bars 11 extend between the bars 13. The end portions of the bars 13 are secured in rings 15 which encircle the bars 11. Mounted in the inner end portions of the bars 11 are bolts 16 which are slidable in the slots 14.

The rear end portions of the units 1 are connected for adjustment toward or away from each other through the medium of a toggle which is designated generally by the reference numeral 17. At their outer ends the links 18 of the toggle 17 terminate in discs 19 which are journaled on pins 20 which are mounted on the rear arches 7. Metallic plates 21 (see Fig. 2) are provided above and below the discs 19 on the pins 20. The toggle 17 is controlled through the medium of metallic bars 22 having one end adjustably connected to the links on one side of said toggle, as at 23. The other ends of the bars 22 are connected to the other links 18 of the toggle 17 by a pin and slot connection 24. The reference numeral 25 designates weights which are mounted on the pins 20 above the toggle discs 19.

Journaled on the lower portions of the pins 9 between the braces 8 and extending forwardly therefrom are pairs of bars 26. Loosely mounted between the forward end portions of the pairs of bars 26 are rings 27. The rings 27 are connected to a draft bar 28. It may be well to here state that the device may be drawn by any suitable power.

It is thought that the manner in which the implement functions will be readily apparent from a consideration of the foregoing. Briefly, as the implement is drawn over the ground the runners 2 of the units 1 straddle the rows and the blades 3 scrape the weeds, etc., between said rows. The elements 5 are adapted to destroy the weeds which are closely adjacent the rows and which escape the blades 3. The connections between the units 1 are such as to permit flexibility as well as to allow for limited lateral adjustment. Also, the units 1 are capable of longitudinal movement relative to each other. The pairs of discs 10 provide comparatively large bearing surfaces or supports for the connecting bars 11. The weights 25 press the disks 19 together between the plates 21 thereby frictionally resisting operation of the toggle 17 and consequently opening and closing of the units 1. Then, the bars 22 constitute means for positively limiting the opening and closing of the units 1. Of course, the device may be made for as many rows as desired.

It is believed that the many advantages of an agricultural implement constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. An agricultural implement comprising a pair of spaced, parallel sled units, means pivotally connecting the forward end portions of said units together, said units including pairs of spaced, parallel runners, arches mounted between the rear end portions of the runners for securing said runners together, and blades mounted on the runners, vertical pins rising from the arches, a toggle connecting said rear end portions of the units together for opening and closing movement relative to each other, said toggle including opposed disks on its ends journaled on the pins, plates mounted on the pins above and below the disks, weights mounted on the pins for pressing the disks together between the plates for frictionally resisting operation of the toggle and opening and closing of the units, and bars mounted on the toggle for positively limiting the opening and closing movement of the units.

2. An agricultural implement comprising a pair of spaced, parallel sled units, each unit including a pair of spaced, parallel runners, arches connecting the forward portions of the runners, and blades mounted on said runners, vertically spaced braces mounted horizontally in the arches, pins mounted vertically on the arches and rising thereabove, the lower portions of said pins extending between the braces, means mounted on the pins between the pairs of braces for connection with a source of power, connecting bars journaled on the upper portions of the pins above the arches, and disks mounted on the pins above and below the connecting bars and constituting bearing surfaces for the outer end portions of said connecting bars.

JAMES P. TURNER.